United States Patent [19]
Roberts

[11] Patent Number: 5,964,017
[45] Date of Patent: Oct. 12, 1999

[54] SEAT COVER RETAINER APPARATUS AND METHOD OF USING SAME

[76] Inventor: Clifford D. Roberts, 22230 Cass, Farmington Hills, Mich. 48335

[21] Appl. No.: 09/001,835

[22] Filed: Dec. 31, 1997

Related U.S. Application Data

[62] Division of application No. 08/752,201, Nov. 19, 1996, Pat. No. 5,733,001.

[51] Int. Cl.⁶ ............................................... B68G 7/00
[52] U.S. Cl. ........................... 29/91.1; 29/91.4; 29/91.5; 297/218.1; 297/452.59; 24/297; 5/402
[58] Field of Search ............................. 29/91.1, 91.2, 29/91.5, 453; 5/402, 403, 404, 406; 24/577, 297, 453; 297/452.6, 452.59, 452.62, 218.2, 218.1

[56] References Cited

U.S. PATENT DOCUMENTS

| | | | |
|---|---|---|---|
| 2,035,674 | 3/1936 | Sipe | 24/577 |
| 3,004,643 | 10/1961 | MacCallum . | |
| 3,233,253 | 2/1966 | Cauvin | 5/404 |
| 3,276,309 | 10/1966 | Engstrom . | |
| 3,363,572 | 1/1968 | Holmler | 297/455 |
| 3,630,572 | 12/1971 | Homier | 297/452.6 |
| 3,632,164 | 1/1972 | Radke | 297/219 |
| 3,649,974 | 3/1972 | Baruth et al. | 297/452.62 X |
| 3,951,455 | 4/1976 | Bandel et al. . | |
| 3,959,853 | 6/1976 | Talan . | |
| 3,961,823 | 6/1976 | Caudill, Jr. . | |
| 3,988,034 | 10/1976 | Fister, Jr. | 297/455 |
| 3,995,892 | 12/1976 | Hellman et al. | 297/219 |
| 4,057,292 | 11/1977 | Arnold | 297/452 |
| 4,452,488 | 6/1984 | Rugienius | 297/452 |
| 4,558,905 | 12/1985 | Natori . | |
| 4,579,389 | 4/1986 | Shimbori et al. | 297/452.6 |
| 4,679,851 | 7/1987 | Solie et al. | 297/452 |
| 4,765,045 | 8/1988 | Selbert et al. . | |
| 4,789,201 | 12/1988 | Selbert | 297/452 |
| 4,833,741 | 5/1989 | Mizuno et al. | 5/404 |
| 4,871,289 | 10/1989 | Choiniere . | |
| 4,881,997 | 11/1989 | Hatch . | |
| 5,067,772 | 11/1991 | Koa . | |
| 5,178,501 | 1/1993 | Carstairs . | |
| 5,191,513 | 3/1993 | Sugiura et al. | 24/297 X |
| 5,217,337 | 6/1993 | Junemann et al. | 411/45 |
| 5,401,075 | 3/1995 | Venuto et al. | 297/452.59 X |
| 5,605,373 | 2/1997 | Wildern, IV et al. | 297/218.4 |
| 5,641,552 | 6/1997 | Tillner | 428/102 |
| 5,733,001 | 3/1998 | Roberts | 297/218.1 |

FOREIGN PATENT DOCUMENTS

| | | | |
|---|---|---|---|
| 2486922 | 1/1982 | France . | |
| 2357491 | 5/1974 | Germany | 297/452.6 |
| 4-89084 | 3/1992 | Japan | 29/91.5 |
| 5-76667 | 3/1993 | Japan | 29/91.5 |
| 06304353 | 11/1994 | Japan | 29/91.5 |
| 0760697 | 11/1956 | United Kingdom | 24/577 |
| 1050610 | 12/1966 | United Kingdom . | |

*Primary Examiner*—S. Thomas Hughes
*Assistant Examiner*—John Preta
*Attorney, Agent, or Firm*—Peter D. Keefe

[57] ABSTRACT

A retainer apparatus for attaching a seat cover to a foam cushion, wherein the retainer apparatus has a base component embedded in the foam cushion and an anchor component connected with the seat cover, wherein further the connection of the anchor component to the seat cover is facilitated by its being selectively reconfigured for that purpose. The base component has a plurality of engagement apertures formed therein. The anchor component includes a bifurcated pedestal and a plurality of rams upstanding therefrom. Each ram has a barbed head for being anchoringly engaged with a respective engagement aperture. Each of the heads has a living hinge at its tip which serves to enable the anchor component to be reconfigured between an open configuration, used when attaching the seat cover to the bifurcated pedestal, and a closed configuration, used when the rams are inserted into the engagement apertures. Preferably, a selectively releasable snap fit is provided at each head for holding the anchor component in the closed configuration.

2 Claims, 4 Drawing Sheets

SEAT COVER RETAINER APPARATUS AND METHOD OF USING SAME

CROSS-REFERENCE TO RELATED APPLICATIONS

The present application is a divisional application of application Ser. No. 08/752,201, filed on Nov. 19, 1996, now Pat. U.S. No. 5,733,001.

BACKGROUND OF THE INVENTION

1. Field of the Invention

The present invention is related to seats having an exterior seat cover which is retained tightly and conformably with respect to an interior foam cushion. More particularly, the present invention relates to retainers used to attach the seat cover to the foam cushion. Still more particularly, the present invention relates to a retainer apparatus having a base component embedded in the foam cushion and an anchor component connected with the seat cover which is interlocked with respect to the base component to thereby attach the seat cover to the foam cushion.

2. Description of the Prior Art

Seats having an interior foam cushion and an exterior seat covering have become ubiquitous, especially in automotive seating applications. In this regard, the foam cushion is provided with a predetermined shape in terms of the seat and back portions thereof, and is further typically provided with frame attachment provisions, such as for example an embedded metallic structure for being attached to a framework at the bottom of the seat. The seat cover provides an attractive, durable, protective and comfortable covering for the foam cushion. Typical materials include cloth, vinyl and leather. In order for the seat cover to be pleasingly and functionally interconnected with the foam cushion, the seat cover must be tightly conformed to the contour of the foam cushion. Usually, grooves are provided in the foam cushion to provide an attractive appearance to the seat and, sometimes, to provide a juncture for pieces of the seat cushion, wherein the seat cover must also conform to these grooves.

In the prior art, there are several approaches taken to attach seat covers to foam cushions. One approach is to use hog rings, as generally discussed in U.S. Pat. No. 3,961,823. Another approach is to use VELCRO (trademark of Velcro USA), as generally discussed in U.S. Pat. No. 4,991,997. Yet another approach is to use clips, as generally discussed in U.S. Pat. Nos. 3,951,455 and 5,401,075 and French Patent No. 2,486,922.

The approach having widest present acceptance is described generally in U.S. Pat. No. 4,765,045. Two sections of the seat cover are sewed together with a protruding plastic trim piece. A tooling having the foam cushion contour, inclusive of projections for interfacing with the grooves, is provided. The projections of the tooling include a groove into which the trim piece inserts. Adhesive is applied, then foam cushion is inverted and placed upon the tooling to thereby secure the seat cover to the foam cushion. After removal of the tooling, the protruding plastic trim is torn away.

While the above approaches to attaching a seat cover to a foam cushion are reasonably viable, there remain substantial problems which yet remain unaddressed. For example, there is a need to provide attachment of the seat cover to the foam cushion in an easily and quickly performed operation, either by hand or by machine, with great accuracy and reproducibility. There is further a need to provide a fast and efficient interconnection between whatever fasteners are used and the respective seat cushion and the seat cover. Lastly, there remains a need to achieve the foregoing with beautiful and comfortable result.

SUMMARY OF THE INVENTION

The present invention is a retainer apparatus for attaching a seat cover to a foam cushion, wherein the retainer apparatus has a base component embedded in the foam cushion and an anchor component connected with the seat cover, wherein further the connection of the anchor component to the seat cover is facilitated by its being selectively reconfigured for that purpose.

The retainer apparatus according to the present invention includes, generally: a planar, elongated base component having a plurality of engagement apertures disposed therealong, the base being embedded into the foam cushion; and an elongated anchor component composed of a bifurcated pedestal and a plurality of rams upstanding therefrom. Each ram has a barbed head for being anchoringly engaged with the engagement apertures. Each ram includes two feet connected with the head, wherein one foot is respectively connected to each of the pedestal members of the bifurcated pedestal. The head has a living hinge at its tip which serves to unite the pedestal members via the feet. Preferably, a selectively releasable snap fit is provided at each head for allowing the heads to be opened, wherein the feet are spread apart, or held closed, wherein the feet are adjacent each other.

In operation, the base component is embedded into the foam cushion, preferably at the time the cushion is formed. Generally, the base component is located along any groove of the cushion component to which the seat cover will be required to taughtly conform. The anchor component is sewed onto two pieces of the seat cover. This is achieved by the heads being opened so that the feet are spread apart, whereby a sewing machine can easily access separately each of the pedestal members of the bifurcated pedestal The heads are then closed. Next, the seat cover is generally located with respect to the seat cushion in an orientation approximate to the final desired interface therebetween. Finally, the anchor component is pressed into engagement with the base component, whereby the barbs of the heads pass through the engagement apertures whereupon the base component and anchor component are interlocked and the seat cover is tightly secured to the foam cushion.

The interconnection process of the anchor component with the base component may be effected by hand or by an automated machine. In the latter, it is preferable to include alignment holes in the base component which interface with alignment probes on the machine to ensure proper alignment between the base component and the anchor component in advance of the pressing step.

Accordingly, it is an object of the present invention to provide a retainer apparatus for interlockingly connecting a seat cover to a foam cushion.

It is an additional object of the present invention to provide a retainer apparatus for interlockingly connecting a seat cover to a foam cushion, wherein a base component is embedded in the foam cushion and an anchor component is secured to the seat cover.

It is an additional object of the present invention to provide a retainer apparatus for interlockingly connecting a seat cover to a foam cushion, wherein a base component is embedded in the foam cushion and an anchor component is secured to the seat cover, the anchor component being openably reconfigurable to provide easy connection of the seat cover thereto.

It is an additional object of the present invention to provide a retainer apparatus for interlockingly connecting a seat cover to a foam cushion, wherein a base component is embedded in the foam cushion and an anchor component is secured to the seat cover, wherein the interconnection is reliable and easily performed in a blind manner.

These, and additional objects, advantages, features and benefits of the present invention will become apparent from the following specification.

DETAILED DESCRIPTION OF THE PREFERRED EMBODIMENT

Figure 1:
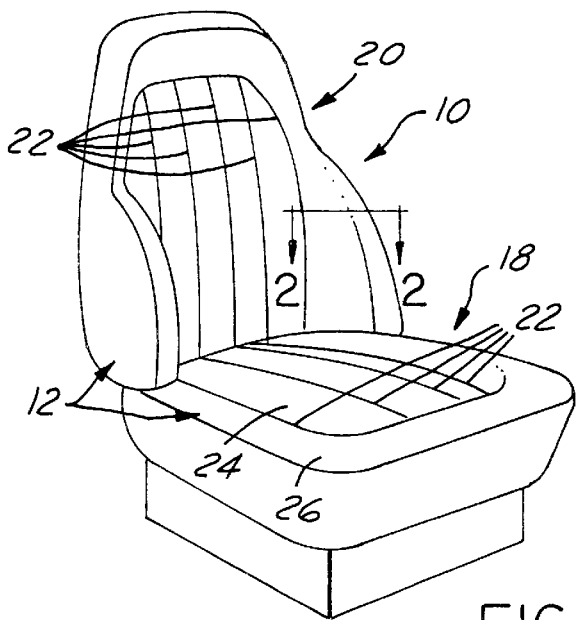
FIG. 1 is a perspective view of a seat having an interior foam cushion and an exterior seat cover which has been assembled using the retainer apparatus according to the present invention.
Figure 2:
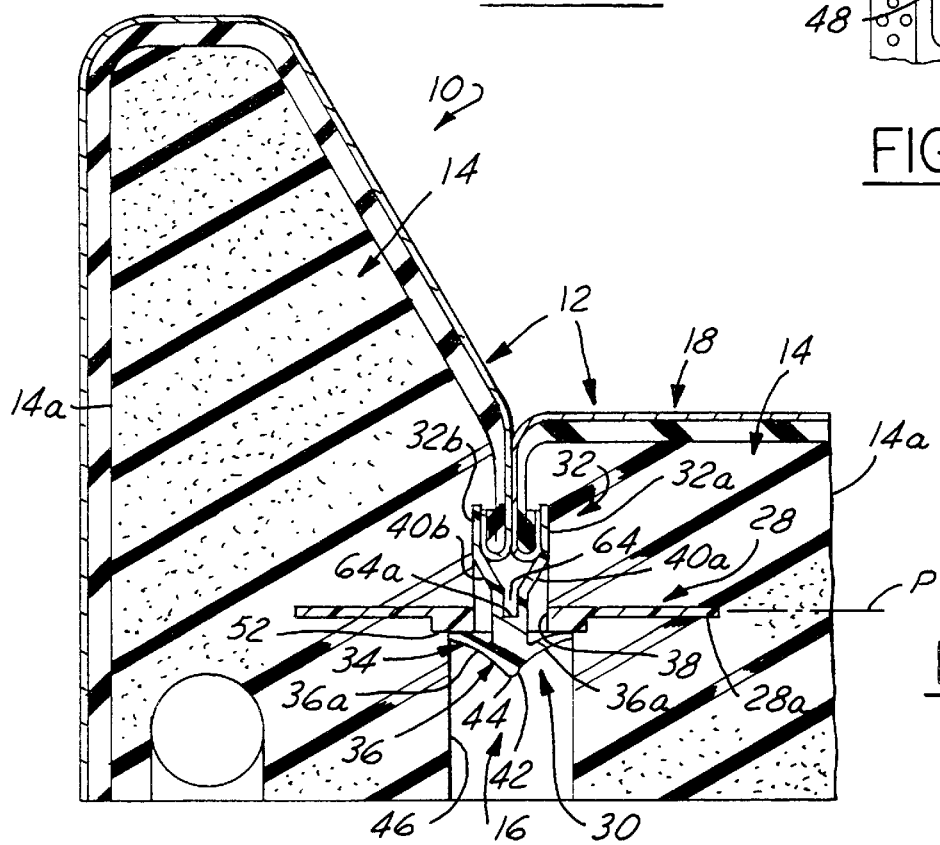
FIG. 2 is a cross-sectional view of the seat taken along line 2—2 in FIG. 1.

Referring now to the Drawing, FIG. 1 depicts a seat 10 in which the exterior seat cover 12 thereof has been connected with an interior foam cushion 14 (see FIG. 2), wherein the connection has been effected by the retainer apparatus 16 according to the present invention (see FIG. 2). The seat 10 includes a seating member 18 and a back member 20, each of which being covered by respective portions of the seat cover 12. The seat 10 includes grooves 22 for enhanced appearance, as well as a demarcation of the seating area 24 from the bolsters 26. As shown in FIG. 2, the retainer apparatus 16 is located along some or all the grooves, especially along the demarcational groove 22a demarcating the seating area 24 from the bolsters 26. Typically, the seat 10 has a seat cover 12 that is in the form of a skin-like covering or is in the form of a skin-like covering having a foam or padded underside, as shown in FIG. 2.

As depicted by FIG. 2, the retainer apparatus 16 is generally composed of a base component 28 which is embedded within the foam cushion 14; and an anchor component 30, itself composed of a bifurcated pedestal 32 and a plurality of rams 34 upstanding therefrom. Each ram 34 has an arrow-shaped barbed head 36, and the base component 28 is provided with a plurality of mutually spaced engagement apertures 38, wherein each barbed head is structured for being anchorably received by a respective engagement aperture. Each ram 34 further includes two feet 40a, 40b connected with the head 36, wherein one foot is respectively connected to each of the pedestal members 32a, 32b of the bifurcated pedestal 32. The head 36 has a living hinge 42 at its tip 44 which serves to unite the pedestal members 32a, 32b of the bifurcated pedestal 32 via the feet 40a, 40b. The head 36 is selectively openable whereby the feet 40a, 40b and the respectively connected pedestal members 32a, 32b are spread apart.

Operatively, with the anchor component 30 in an open configuration, first and second sections 12a, 12b of the seat cover 12 (see FIG. 9) are then respectively sewingly joined to the pedestal members 32a, 32b. Thereupon, the heads 36 are snapped closed whereby the anchor component is now in a closed configuration. The rams 34 are then pressed receivingly into respective engagement apertures 38, whereupon, as shown in FIG. 2, the seat cover 12 is taughtly attached to the foam cushion at each of the back seating area 24 and the bolster 26.

The structure and function of the retainer apparatus 16 will now be further detailed with reference being directed additionally to FIGS. 3 through 10, wherein, preferably, both the base component and the anchor component are composed of plastic material and are provided by an injection molding process.

In order for the retainer apparatus 16 to function as described above with respect to a seat 10, the foam cushion 14 is provided with an access slot 46 wherever the base component 28 is to be placed therewithin. The placement of each access slot 46 relative to the foam cushion 14 is such as to be in alignment and communication with a selected respective groove 22 (see FIGS. 2 and 5). The access slot 46 provides an entry port for an abutment tool to abuttingly engage the base component 28 when the heads 36 of the anchor component 30 are forced through the engagement apertures 38 during an interconnection process, as will be discussed hereinbelow.

Figure 3:
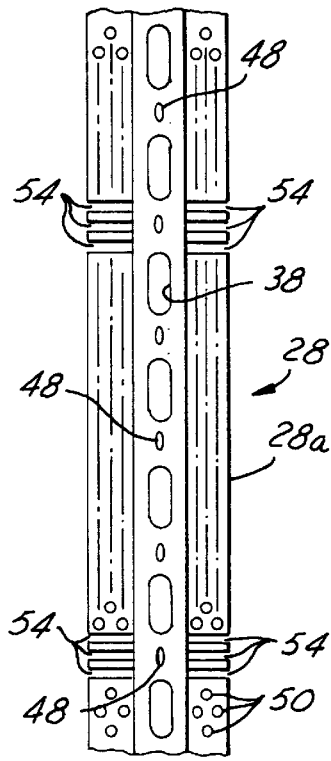
FIG. 3 is a top plan view of the base component of the retainer apparatus according to the present invention.
Figure 4:
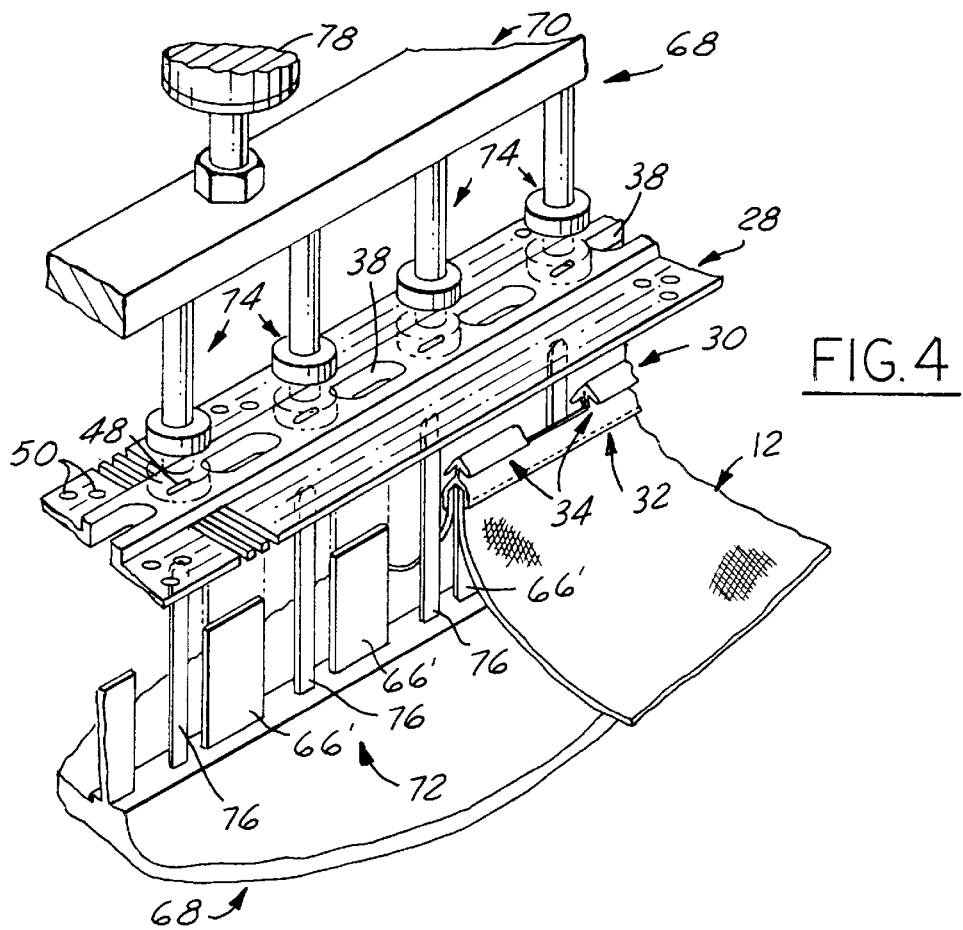
FIG. 4 is a perspective, partly broken away view showing the retainer apparatus according to the present invention and an automated press apparatus for interconnecting the base and anchor components of the retainer apparatus, wherein a seat cover is shown connected with the anchor component, and wherein a foam cushion connected with the base component is not shown for clarity.

As shown best by FIGS. 2 through 4, the base component 28 is in the form of a thin, planar, and elongated base body 28a for being fixedly embedded in the foam cushion along a selected groove 22 thereof. Centrally located along the length of the base component 28 is a plurality of elongated engagement apertures 38 formed in the base body 28a. The engagement apertures 38 are regularly spaced apart and are uniformly dimensioned, preferably having an elongated oval shape. Located in between adjacent engagement apertures 38 are alignment holes 48 formed in the base body 28a. The alignment holes 48 are used for locating the base and anchor components 28, 30 during an automated interconnection process; however, where interconnection is performed manually (or possibly even in certain automated interconnection processes), the alignment holes may be obviated.

In order that the base component is locatably affixed inside the foam material 14a of the foam cushion 14, a large number of affixment openings 50 are provided in the base body 28a. In this regard, as the foam material 14a is formed, the foam material passes through the affixment openings 50, thereby ensuring the base component 28 cannot slidably move inside the foam material.

In order that the base body 28a is able to structurally withstand tensioning caused by the barbs 36a of the head 36 acting on the base body at the engagement holes 38 due to taughtness of the seat cover 12, the base body is preferably provided with a thickened medial portion 52a along its length. Further, in order that the base body 28a is enabled to curve along its length in the plane P of the base body (see FIG. 2), the outer portions 52b on either side of the thickened medial portion 52a are periodically provided with a series of closely spaced cuts 54 (curvature of the base body transverse to the plane P is inherently enabled due to the thinness of the base body in relation to its length).

Figure 9:
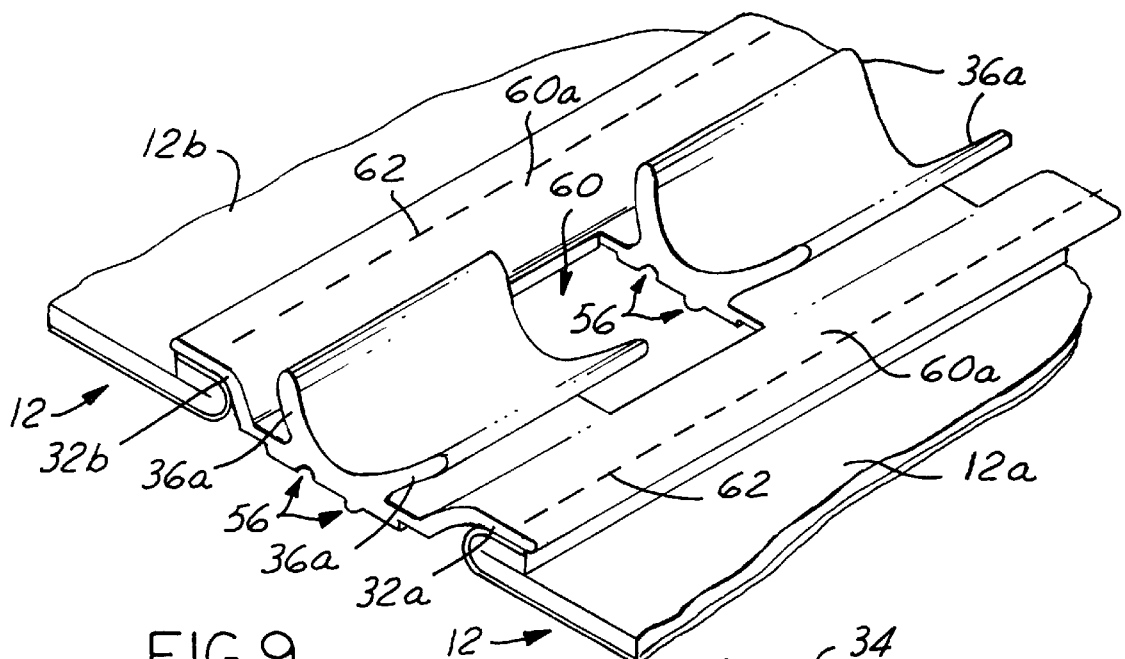
FIG. 9 is a broken away perspective view of the anchor component of the retainer apparatus according to the present invention, shown in an open configuration for being connected with sections of a seat cover.
Figure 10:
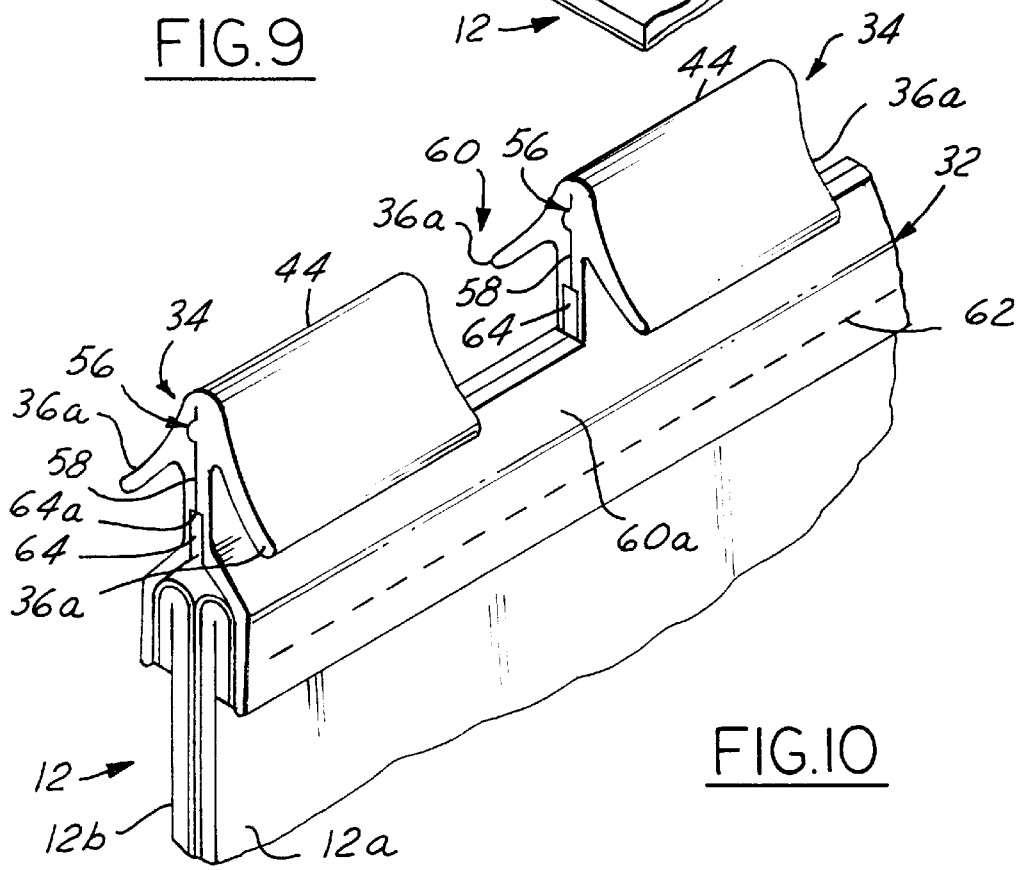
FIG. 10 is a broken away perspective view of the anchor component of the retainer apparatus according to the present invention, shown in a closed configuration and connected with the sections of the seat cover of FIG. 9.

As shown at FIGS. 9 and 10, the anchor component 30 is selectively configurable between an open configuration and a closed configuration. As depicted by FIG. 9, the anchor component 30 may be placed into an open configuration, wherein the feet 40a, 40b are mutually spread apart; and as depicted by FIG. 10, the anchor component 30 may be placed into a closed configuration, wherein the feet 40a, 40b are mutually adjoined and held so by a snap mechanism 56. In this regard, the head 36 is provided with a living hinge 42 at its tip 44, and the head is provided with a medial slit 58 emanating from the living hinge toward the feet 40a, 40b. The preferred snap mechanism 56 is for example of a ball-and-socket type (as shown) which directly communicates with the medial slit 58.

Each ram 34, inclusive of a head 36 and its feet 40a, 40b, is mutually spaced from adjacent rams in conforming alignment with the spacing of the engagement apertures 38 of the base component 28, wherein the bifurcated pedestal 32 extends continuously in general co-terminal relation to the base body 28a (that is, the base body and the bifurcated pedestal are generally about the same length). In this regard, as shown best by FIG. 10, the interstitial space 60 between heads 36 is structurally maintained by an interstitial portion 60a of the bifurcated pedestal 32. The barbs 36a are opposingly situated and are structured to resiliently compress as they pass through a respective engagement aperture 38 when passed therethrough tip 44 first, whereupon the barbs resiliently spread beyond respective opposing sides of the engagement aperture so as to interferingly abut the base body 28a and thereby prevent the head from retracting out of the engagement aperture.

Referring now to FIGS. 9 and 10, the connection of the seat cover 12 to the anchor component 30 will be detailed.

As depicted best by FIG. 9, in order to connect a seat cover 12 to the anchor component 30, the anchor component is first placed into the open configuration. When the anchor component is in the open configuration (FIG. 9), the pedestal members are spread out in a plane which is generally transverse to the plane of the pedestal members when the anchor component is in the closed configuration (FIG. 10). Now, first and second sections 12a, 12b of a seat cover 12 are then sewed onto respective pedestal members 32a, 32b. In this regard, since the pedestal members 32a, 32b are well separated from each other, the sewing of each seat cover section 12a, 12b to the respective pedestal members 32a, 32b to thereby provide a sewed seam 62 connection therebetween is easily accomplished without any interference of one by the other. It will be noticed that the sewed seams 62 extend along the bifurcated pedestal 32 inclusive of the interstitial portions 60a thereof.

As depicted by FIG. 10, once the sewing of the sewed seams 62 has been completed, the feet 40a, 40b and the respective pedestal members 32a, 32b are brought mutually toward each other via bending at the living hinge 42. The snap mechanism 56 is snapped closed to thereby hold the anchor component 30 in the closed configuration.

As depicted best by FIG. 10, as well as by FIGS. 5 through 8, a tool seat 64 is preferably provided in the head 36 in alignment with the medial slit 58. The tool seat 64 receives a thrust tool 66 used during the interconnection process, whereby the thrust tool 66 firmly abuts the terminous 64a of the tool seat.

Referring now to FIGS. 4 through 8, the interconnection process will be detailed, including an example of a preferred automated apparatus therefor.

Figure 6:
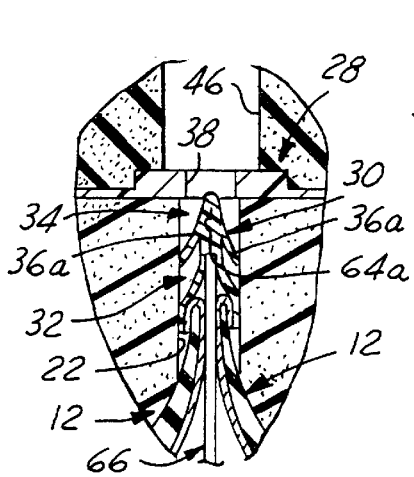
FIGS. 6 through 8 are partly sectional detail side views which progressively show the anchor component being pressably engaged with respect to the base component in a typical operational environment of use of the retainer apparatus according to the present invention.
Figure 7:
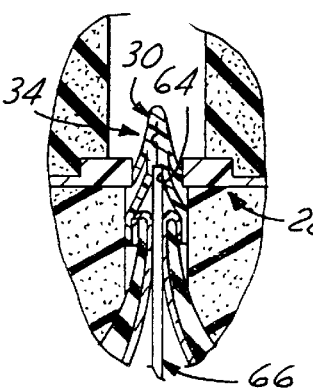
Figure 8:
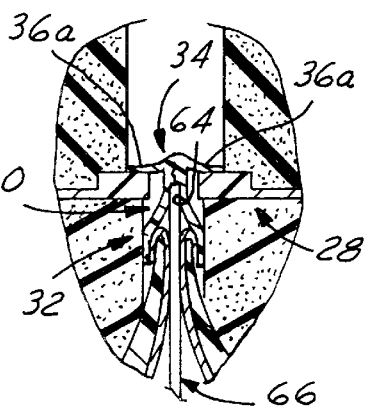
Figure 5:
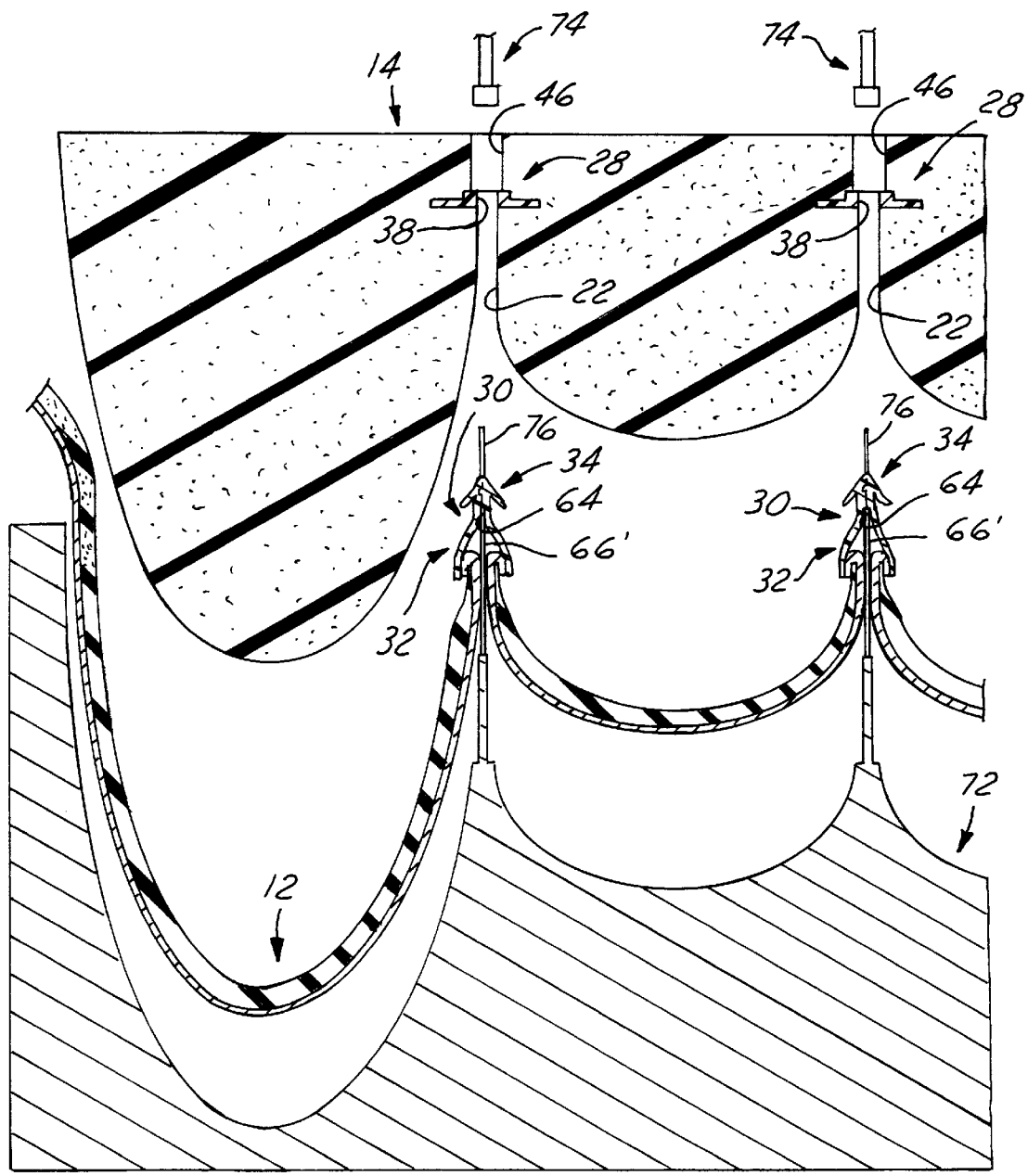
FIG. 5 is a partly sectional side view of a seat about to be assembled using the retainer apparatus according to the present invention via the automated press apparatus of FIG. 4.

As depicted by FIGS. 6 through 8, the process of interconnection of the base component 28 with the anchor component 30 is shown. Firstly, a thrust tool 66 is placed into the tool seats 64 of the anchor component 30. Next, the thrust tool 66 is moved toward the base component 28, during which, as shown in FIG. 7, the barbs 36a are resiliently deformed so as to pass through the engagement apertures 38. Finally, as shown in FIG. 8, the barbs 36a have passed entirely through the engagement apertures and have now resiliently expanded to now be entrapped on the base component. The interconnection process may be carried out manually, wherein the thrust tool is hand held. During a hand operated interconnection process, it may, or may not, be necessary to provide an abutment tool (not shown in FIGS. 6 through 8) through the access slot 46. Alternatively, the interconnection process may be carried out by machine, as depicted by way of preferred example in FIGS. 4 and 5.

A tool 68 is provided having an upper tool member 70 and a lower tool member 72. The upper tool member 70 has a plurality of regularly spaced apart abutment tools 74. The abutment tools 74 are dimensioned to be received into the access slots 46 so as to abut the base component 28 at the alignment holes 48. The lower tool member 72 includes a plurality of alignment pins 76 which are located so as to be receivable into the alignment holes 48. The lower tool member 72 further includes a plurality of thrust tools 66' which are spaced and sized to be received into each of the tool seats 64 of the anchor component 30. Appropriate conventional actuators 78 provide selective pressing of the upper tool member 70 with respect to the lower tool member 72.

In operation of the automated interconnection process (see FIGS. 4 and 5), the seat is held by a jig (not shown) of a tool 68 so that the foam cushion 14 is positioned such that the access slots 46 are aligned with the abutment tools 74, wherein the foam cushion has been formed with the base component 28 fixedly located therein. The seat cover 12 has been connected to the bifurcated pedestal 32, and the thrust tools 66' are placed into respective tool seats 64. The tool 68 provides precise alignment of the rams 34 with the engagement apertures 38. The alignment is preferably achieved via the alignment pins 76 passing through the alignment holes 48, whereupon the base component is aligned true with the lower tool member. In this regard further, it is preferred for the trust tools to be equally as wide as the rams so when these components are aligned, the anchor component is aligned true with the lower tool member. Alternatively, alignment could be provided by microprocessor based robotic control, as is generally known in the industrial arts, with or without one or more alignment pins. Next, the abutment tools 74 descend to abut the base component and the thrust tools 66' ascend to abut the terminous of the tool seat 64. Thereupon, the thrust and abutment tools are mutually pressed toward each other, thereby forcing the barbs 36a of the heads 36 entirely through respective engagement apertures 38. Now, with the heads firmly locked onto the base component, the seat cover is affixed to the foam cushion at the groove 22. The thrust and abutment tools then are withdrawn from the seat.

The tool 68 may perform the aforesaid operation at several seams 22 simultaneously, or may move from seam to seam successively. In any event, the seat cover is affixed to the foam cushion both taughtly and beautifully.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method for affixing a seat cover to a foam cushion using a retainer apparatus comprising a base body having a plurality of engagement apertures formed therein and an anchor component having a plurality of barbed heads connected to a bifurcated pedestal having a first pedestal member and a second pedestal member, wherein the barbed heads each have a living hinge joining the first pedestal member to the second pedestal member, the living hinge of each barbed head being bendable between an open position by which the first and second pedestals are mutually separated and a closed configuration by which the first and second pedestals are mutually adjacent, said method comprising the steps of:

forming a foam cushion, wherein the base body is located affixedly within the foam cushion;

bending the living hinge of the barbed heads to the open position;

attaching a first portion of the seat cover to the first pedestal member;

attaching a second portion of the seat cover to the second pedestal member;

bending the living hinge of the barbed heads to the closed position;

placing the seat cover selectable upon the foam cushion;

forcing the barbed heads through respective engagement apertures to thereby cause the barbed heads to barbingly engage the base body to thereby affix the seat cover to the foam cushion.

2. The method of claim 1, further comprising the step of:

forming a selected groove in the foam cushion, wherein the base body is located affixedly within the foam cushion such that the engagement apertures are aligned with the selected groove.

* * * * *